Dec. 4, 1951 C. W. CHILLSON 2,577,603
PROPELLER PITCH CHANGE MECHANISM
Filed Sept. 24, 1946 5 Sheets-Sheet 1

INVENTOR.
Charles W. Chillson
BY
ATTORNEY

Dec. 4, 1951     C. W. CHILLSON     2,577,603
PROPELLER PITCH CHANGE MECHANISM
Filed Sept. 24, 1946     5 Sheets-Sheet 2

INVENTOR.
Charles W. Chillson
BY
ATTORNEY

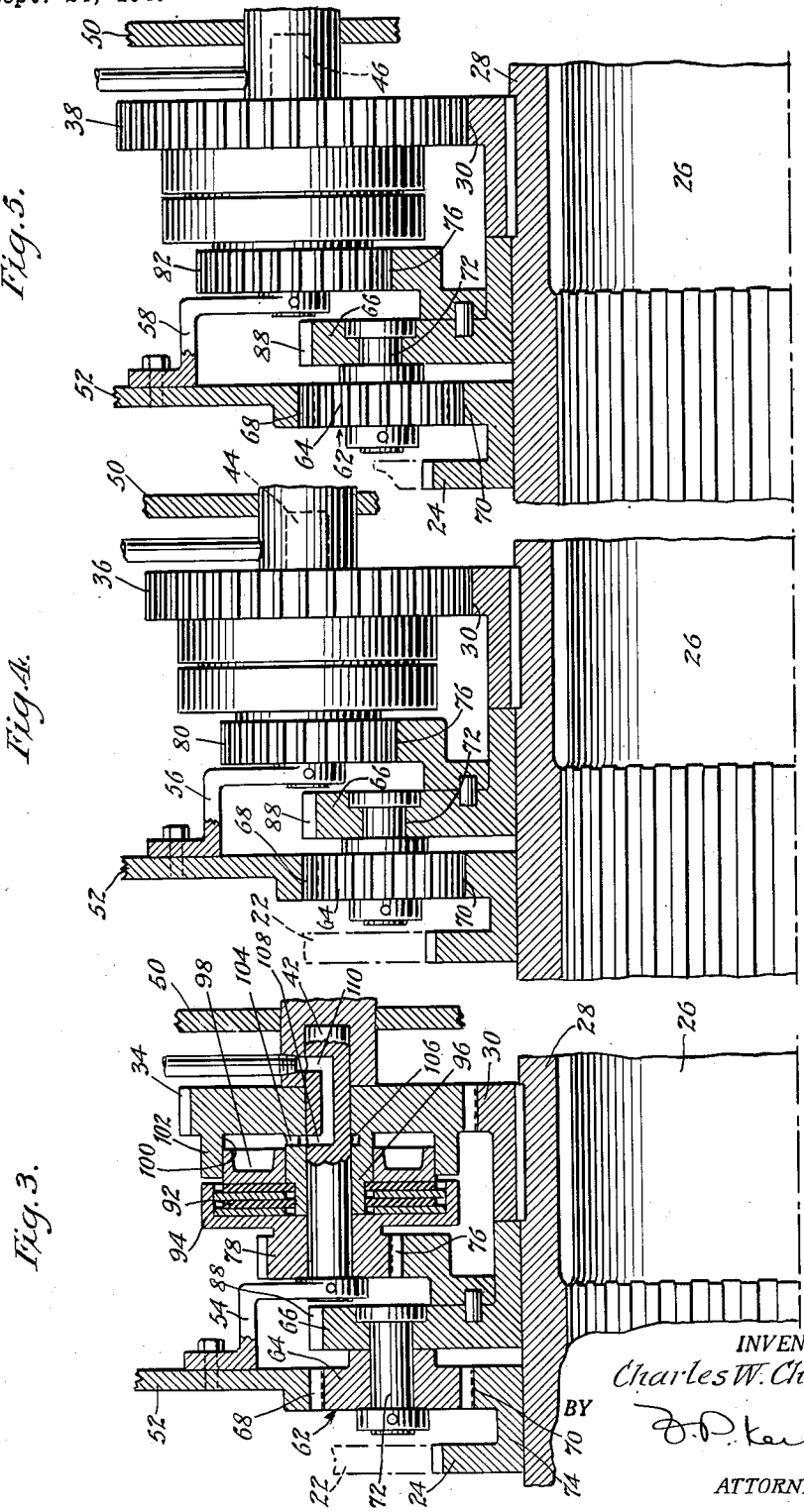

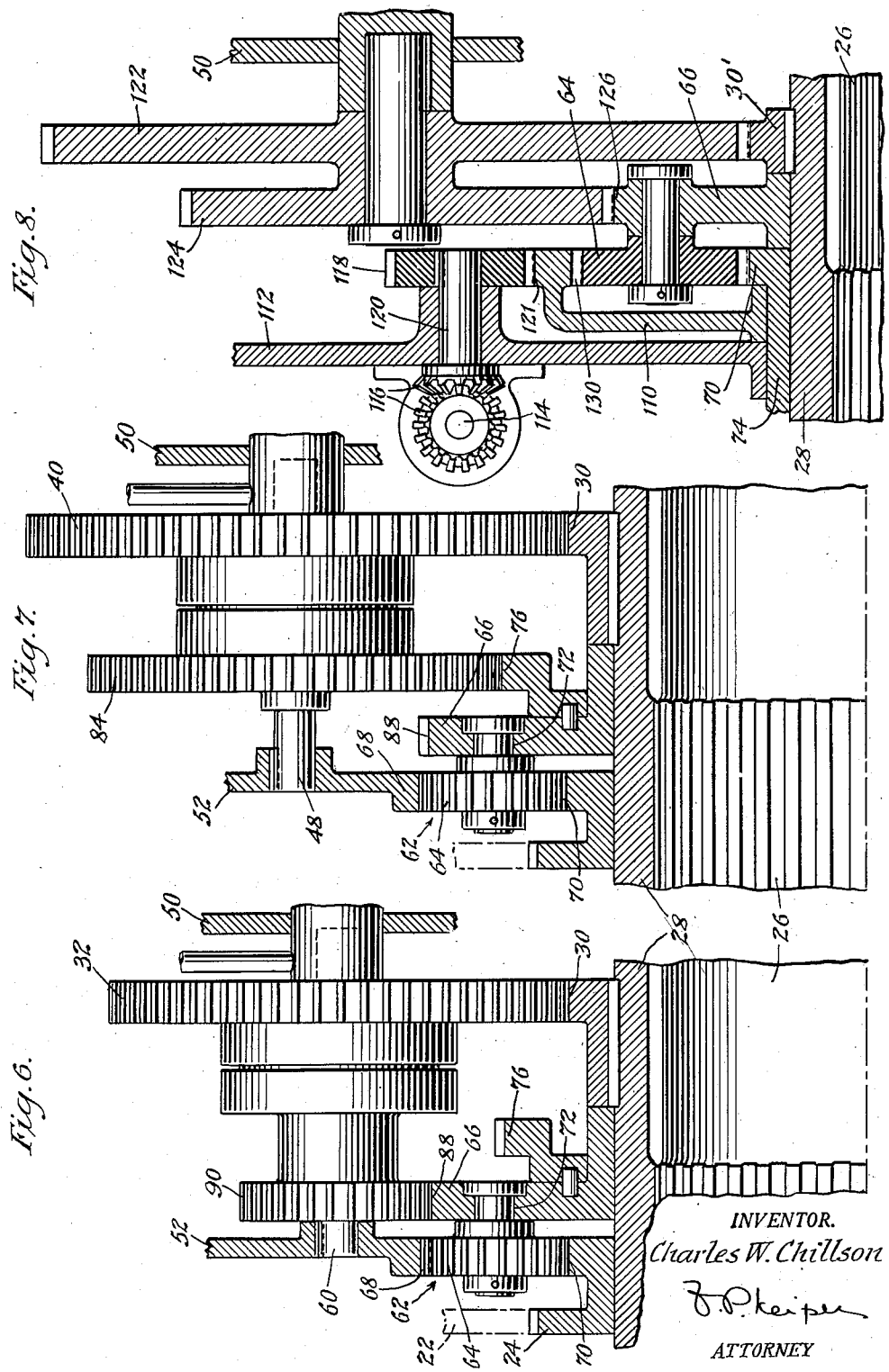

Dec. 4, 1951   C. W. CHILLSON   2,577,603
PROPELLER PITCH CHANGE MECHANISM
Filed Sept. 24, 1946   5 Sheets-Sheet 5

INVENTOR.
Charles W. Chillson
BY
ATTORNEY

Patented Dec. 4, 1951

2,577,603

UNITED STATES PATENT OFFICE 2,577,603

PROPELLER PITCH CHANGE MECHANISM

Charles W. Chillson, Caldwell, N. J., assignor to Curtiss-Wright Corporation, a corporation of Delaware Application September 24, 1946, Serial No. 699,024

9 Claims. (Cl. 170—160.28)

This invention relates to variable pitch propellers and more particularly to pitch varying mechanism wherein the power for effecting changes of pitch is derived from the propeller drive shaft and prime mover.

In variable pitch propellers wherein the pitch may be varied from full feathering position to reverse pitch, it is desirable to provide relatively small increments of pitch change for regulating the propeller load upon the prime mover to maintain constant speed, and also to provide a means of rapid pitch change so that the pitch of the propeller may be rapidly changed from normal pitch toward feather, and from forward to reverse pitch and vice versa for maneuvering and braking purposes. The rate of pitch change desirable under these latter circumstances is in the order of a change of pitch of 45 degrees per second and in order to effect such rapid changes relatively high power must be employed because of the high torque required to overcome the blade centrifugal twisting moment and other resisting forces involved.

It is an object of the present invention to provide a compact rugged mechanical gearing system wherein propeller drive shaft torque may be quickly coupled to the propeller-carried pitch changing gear to effect rapid increase or decrease in pitch or slow increase or decrease in pitch as may be desired.

Another object of the invention is to provide mechanical means for deriving power from the propeller shaft and quickly transmitting such power to the propeller blades through a concentric differential planetary gearing.

Still another object of the invention is to provide in such a system as described, a means for varying propeller pitch through a differential planetary gearing deriving power from either the propeller drive shaft or an auxiliary source of power which may act to effect changes of pitch when the propeller shaft is non-rotating.

The above and many other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views, Fig. 1 is a transverse section of a propeller through the drive shaft, on the line 1—1 of Fig. 2 and showing the general arrangement of gearing for deriving power from the propeller shaft;

Fig. 3 is a section taken substantially on the line 3—3 of Fig. 1, showing the low speed pitch decrease gearing;

Fig. 4 is a section taken substantially on the line 4—4 of Fig. 1 showing the fixed pitch gearing;

Fig. 5 is a section taken substantially on the line 5—5 of Fig. 1 showing the gearing employed for low speed pitch increase;

Fig. 6 is a section taken substantially on the line 6—6 of Fig. 1 showing the gearing employed for high speed pitch decrease;

Fig. 7 is a section taken substantially on the line 7—7 of Fig. 1 showing gearing for effecting high speed pitch increase;

Fig. 8 is a longitudinal section taken through a modified form of the gearing wherein auxiliary means for effecting pitch changes is introduced.

Figure 1:
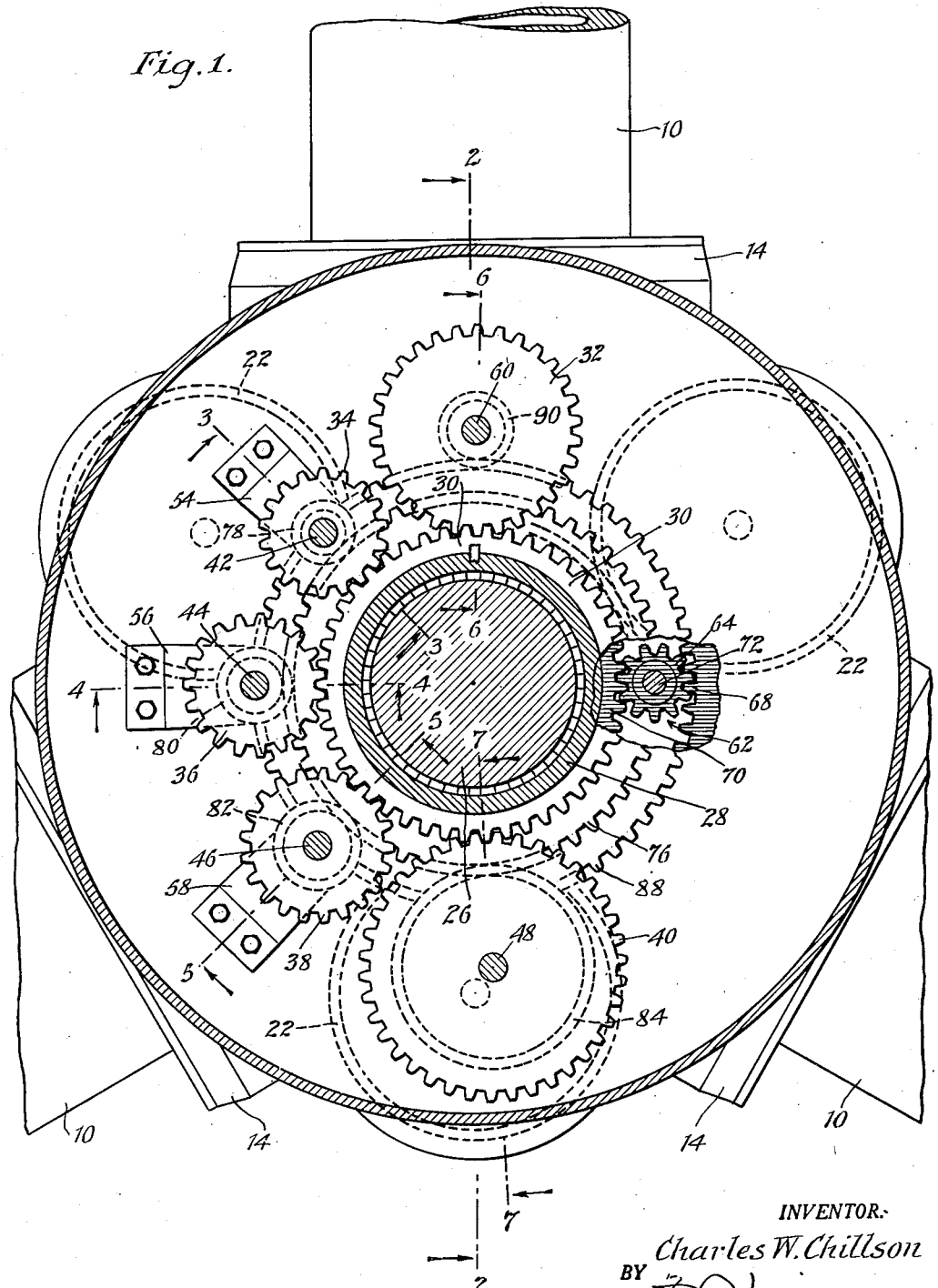
Figure 2:
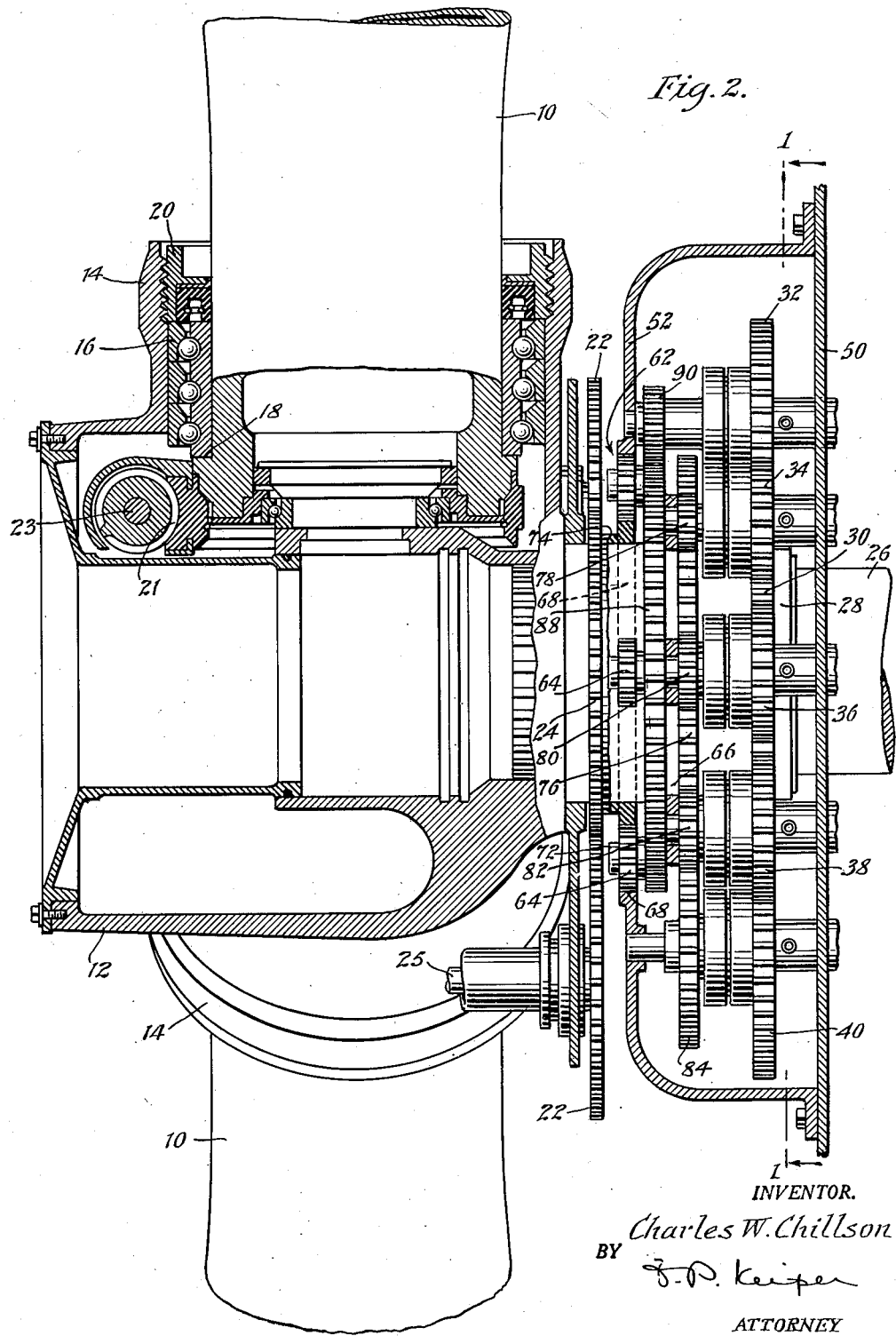
Fig. 2 is a longitudinal section showing the general arrangement of the gearing around the propeller shaft and its connections to the propeller blades.

Referring to Figs. 1 and 2, there is shown a propeller comprising blades 10 swively mounted in blade sockets 14 of a hub 12. The shanks of the blades 10 are journalled on thrust bearings 16 bearing against a shoulder 18 on each blade shank and a retention nut 20 threaded in the end of each socket. A worm and worm wheel drive 21 and bevel gearing disclosed in my copending application filed June 8, 1946, Serial No. 675,383, or other suitable intermediate gearing extends from each blade and is drivably connected with a shaft 25 keyed to a gear 22 rotatable with and with respect to the propeller hub. All gears 22 are meshed with a sleeve gear 24 concentric with the hub axis. The sleeve carried gear 24 is rotatable with respect to the hub and through relative rotation in one direction or the other, an increase or decrease in pitch of all the blades simultaneously may be effected.

The propeller hub is splined on and driven by an engine shaft 26, the hub including an integral hub sleeve 28. In order to derive power from the drive shaft to effect changes of pitch there is keyed to the sleeve 28 a drive gear 30 from which a plurality of axially parallel gears 32, 34, 36, 38 and 40 are driven, the radial distance of the shafts 42, 44, 46 and 48 on which the gears 34, 36, 38 and 40 are rotatably mounted being at varying radial distances from the center of the engine shaft 26. Each of the shafts 42, 44 and 46 is supported from a stationary rear housing plate 50 and from a stationary forward housing plate 52 to the latter of which are secured suitable offset brackets 54, 56 and 58 which render support to the forward ends of the shafts. The shaft 48, and shaft 60 carrying gear 32, are located more radially distant from the drive shaft, and are supported directly in bosses in the forward and rear plates 50 and 52.

Surrounding the hub sleeve 28 is a differential planetary gear train 62 composed of planet gears 64, a planet gear carrier 66 and internal and external gears 68 and 70 meshing with the planet gears 64. The planet gears are freely rotatable on pins 72 mounted in the carrier 66 and the internal gear 68 may be formed integral upon the forward housing plate 52. The external or sun gear 70 may be formed as a part of a sleeve 74 which may in practice be integral with the gear 24 previously described as relatively rotatable with respect to the hub, and by means of which the propeller blade pitch changing gears 22 are driven.

The planet gear carrier 66 is provided with a gear 76 adapted to mesh with pinions 78, 80, 82 and 84 rotatably mounted upon the shafts 42, 44, 46 and 48. A second gear 88 forming a part of the planet carrier 66, and of larger diameter than gear 76, is provided, which gear meshes with a gear 90 rotatably mounted upon the shaft 60 upon which the gear 32 is mounted.

Clutches are provided for coupling the pairs of gears mounted upon the spindles 42, 44, 46, 48 and 60, a suitable form of hydraulic clutch being shown in detail in Fig. 3. In the form shown, the shaft 42 is stationary and the gears 78 and 34 rotate freely thereon in mesh with their respective gears 76 and 30. Friction discs 92 alternately splined within a barrel 94 integral with gear 78 and upon a sleeve 96 integral with gear 34 are adapted to be frictionally engaged by an annular piston 98 operating within an annular cylinder 100 formed in the side face of the gear 34 by the cylindrical portion of the sleeve 96 and the internal cylindrical surface of an annular flange 102. Hydraulic fluid is introduced to the annular cylinder 100 through radial passages 104 connecting with the cylinder 100 and an annular collecting groove 106 within the hub of the gear 34. Aligned with the collector groove 106 is a radial port 108 in the stationary shaft 42 which port is connected by means of an axial connecting port 110 to a valve controlled source of hydraulic fluid. Each of the pairs of gears meshing with the drive gear and the planet carrier gears 76 and 88 are similarly provided with clutches so that any pair of gears may be instantly locked together or released in order to effect transmission of power from the driving gear 30 to the differential planetary gear train 62.

It will be seen that the relative diameters of the gears in any of the gear trains shown in Figs. 3, 4, 5, 6 and 7 may be so chosen either to enforce rotation of the gear 24 faster or slower than the rotation of said hub, the relative rotational speed being determined by the relationship of the various gears chosen. In Fig. 3 the gear 24 is caused to rotate relative to the hub at a relatively low speed to decrease pitch when its clutch is locked. The gears of Fig. 5 are so chosen as to effect a relatively slow pitch increase with a locked clutch. The gears of Fig. 6 are so chosen as to provide a relatively rapid rate of pitch decrease and the gears of Fig. 7 are chosen to effect a relatively rapid pitch increase with their clutches locked respectively. The gears shown in Fig. 4 are so chosen as to enforce rotation of the gear 24 at the same speed as the propeller shaft when its clutch is locked. It will be observed that the radial distance of the shaft 42 from the propeller shaft axis is less than the radial distance of the shaft 44 of Fig. 4 and that the radial distance of the shaft 46 of Fig. 5 is greater than that of shaft 44. The variations in the distance of the shafts 42, 44 and 46 from the propeller shaft inherently require a change in the ratio between the pairs of gears meshing with the planet carrier gear 76 and the driving gear 30. It will be seen that in order to enforce, for example, rotation of the gear 24 at the same speed as the propeller shaft it is necessary to provide a pair of gears 80 and 36 having a ratio such as will drive the planet carrier gear 76 at a proper speed substantially less than the propeller shaft rotation speed and as is determined by the diameter of the planet gears and the sun and ring gears meshing therewith.

If the diameter of the sun gear 70 be chosen the same as the diameter of the drive gear 30, the ratio of the gears 36 and 80, for example (Fig. 4), may be determined in terms of the diameters of the sun gear, the planet carrier gear and of the planet gears. To enforce rotation of the sun gear at the same speed as the propeller shaft, such gears should bear the following relation, where the gun gear and drive gear 30 are of the same diameter.

$$\frac{\text{Dia. gear } 80}{\text{Dia. gear } 36} = .5 \frac{\text{Dia. carrier gear } 76}{\text{Dia. sun gear } 70 + \text{Dia. planet gear } 64}$$

In order to cause relative rotation of the gear 24 with respect to the propeller shaft, it is essential to select a pair of gears having a ratio greater or less than the ratio required for fixing the rotation of gear 24 at the speed of the propeller shaft. For example, by decreasing the ratio of the clutch driven and driving gears, from that required for fixing pitch, the gear 24 may be caused to rotate to decrease pitch. By employing but a slight decrease in the ratio between the clutch driven and driving gear, a relatively slow speed decrease pitch movement of gear 24 is provided. Conversely, to provide a low speed increase of pitch it is necessary to employ a ratio between the clutch driven and driving gears slightly in excess of the ratio required for fixed pitch, in which case the sun gear and the gear 24 will be driven in a pitch increase direction relative to the driving shaft. If a faster rate of pitch increase is desired, the ratio between the clutch driven and driving gear may be further increased, for example, as shown in Fig. 7, in which case the diameter of the clutch driven gear more closely approaches that of the clutch driving gear with a result that the relative speed of rotation between the sun gear and the drive shaft in pitch increasing direction is substantially increased.

If a high rate of pitch decrease is desired, such high rate may be obtained by further decreasing the ratio between the clutch driven gear and the clutch driving gear well below the ratio employed for the low speed pitch decrease shown in Fig 3. For practical and mechanical reasons, however, it may be desirable to employ larger gears than would be required for the clutch driving and driven gears for such high speed pitch decrease when meshing with the driving gear 30 and planet carrier gear 76. To permit the use of moderate size gears for such high speed pitch decrease, an additional gear 88 is provided upon the planet carrier, of greater diameter than the gear 76 which permits the shaft 60 (see Fig. 6) to be located radially more distant from the axis of the driving shaft. Through such an arrangement, the ratio between the clutch driven gear 90 and the clutch driving gear 32 may be further reduced while maintaining gears of a practical diameter, and the reduction ratio is further increased by the additional diameter of gear 88 over gear 76 such that the sun gear 70 will be driven in a pitch decrease direction relative to the shaft at a relatively high rate of speed.

It will be observed that any form of hydraulic control for the five clutches disclosed, for example, such as disclosed in my aforementioned copending application, may be employed to instantly couple any one of the clutch driving and driven gears together or to uncouple them, instantaneously to stop pitch changing movement or instantaneously to initiate a change of pitch in either increase or decrease direction at a fast or slow rate as desired, by providing a clutch of proper capacity. The action of the clutches may be effected substantially instantaneously and changes in pitch may be effected at the rates desired because of the high available torque, with relatively small loss of time due to acceleration and deceleration.

In the form of the invention thus far described, it will be apparent that rotation of the propeller shaft is essential to effect changes of pitch. When it is desired to feather a propeller, such feathering action normally is accompanied by a gradual decrease of speed of the engine shaft and the propeller until the full feathering position is approached, at which time rotation ceases unless engine power is applied. It is accordingly desirable to provide an auxiliary source of power to complete the feathering of a propeller or to initially unfeather the propeller a sufficient amount in order that windmilling of the propeller may be established and employed to crank or start the engine and rotate the shaft to effect further pitch change. It will be appreciated that an auxiliary reversible motor of relatively small size may be drivably connected to any of the clutch driven gears such as 84 to effect changes of pitch under these circumstances.

If desired, the motor may be connected to the pitch changing mechanism directly through the differential planetary gear train in a manner shown in the modification of Fig. 8. In this figure, the ring gear 110, instead of being fixed to the forward housing plate as is the ring-gear 68 in Figs. 1–7, is rotatably mounted about the hub sleeve 28 and around the sleeve of the sun gear 70. The ring gear 110 may be rotated by means of an auxiliary motor driven shaft 114 driving through bevel gears 116, a gear 118 journalled at 120 in the forward housing plate 112, which gear 118 meshes with external teeth 121 on the ring gear 110. Thus by rotation of the motor driven shaft 114 in one direction or the other, increases or decreases in pitch may be effected irrespective of propeller rotation. The gears 122 and 124 meshing with the shaft driving gear 30' and the planet carrier gear are illustrated as integrally connected with one another and of such a ratio that upon fixing gear 110, no pitch change may occur.

Figure 9:
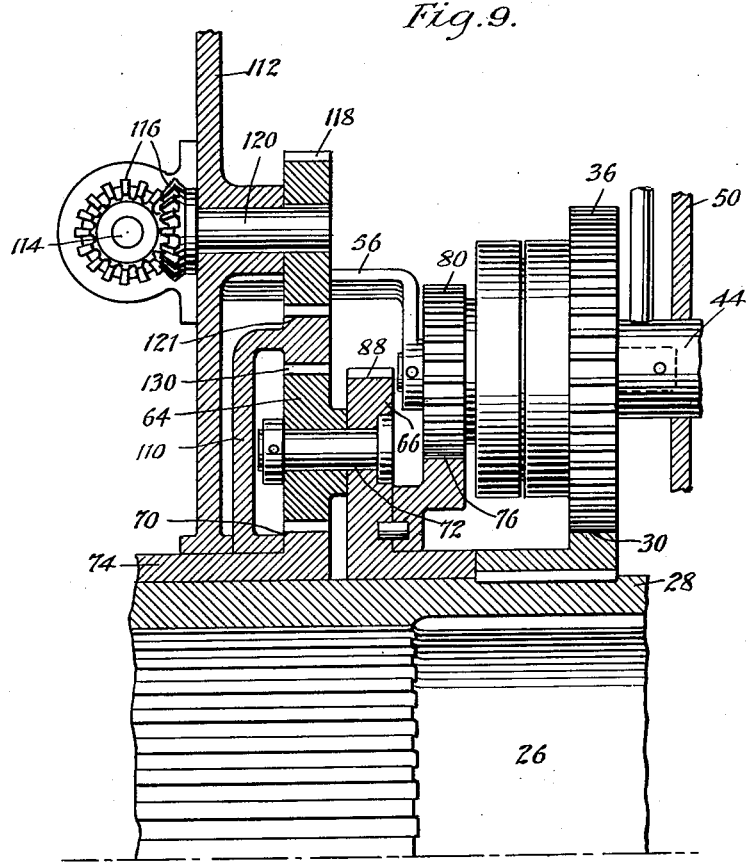
Fig. 9 is a longitudinal section through a further modified form of the invention.

The gears 122 and 124 of Fig. 8 may be coupled and uncoupled by means of a hydraulic clutch similar to that disclosed in Fig. 3. Such a modified form, shown in Fig. 9, may be readily substituted for the gear train shown in Fig. 4 of the modification of Figs. 1–7 to thereby provide means for effecting changes in pitch from power derived from the crankshaft at different rates, or from power derived from a small auxiliary electric motor acting through the shaft 114. It will be also appreciated that under such circumstances the shaft 114 will be braked against rotation at such times as the auxiliary motor is not in operation so that gear 110, and internal gear 130 which corresponds to internal gear 68 of Figs. 1 through 7 inclusive is to all intents and purposes fixed.

From the foregoing description it will appear that a rugged mechanism is provided for transferring pitch changing torque at a relatively high value from the propeller drive shaft and its prime mover and that through relatively simple mechanisms operating upon common concentric shaft carried gears, complete control of propeller pitch may be had both for speed regulating purposes as well as for maneuvering purposes.

Although the description and illustration of the invention has been centered around a single embodiment and slight modifications thereof, it is to be understood that the invention is not limited to the precise disclosure, but may be embodied in many and various equivalent forms. For example, the differential planetary gearing may embody any form including bevel planetary gearing and the sun and ring or internal gears and planet carrier may be transposed with respect to the source of power and the hub carried pitch changing mechanism and reaction taken through the internal gear, such transposition merely requiring changes in the relative size of the eccentric clutch driven and driving gear pairs, the shaft driving gear and the gear connected to the chosen element of the planetary gear train. As such and many other changes in construction and arrangement of parts may be made without departing from the spirit of the invention, as will be apparent to those skilled in the art, reference should be had to the appended claims for definition of the limits of the invention.

What is claimed is:

1. In a variable pitch propeller, a shaft, a gear secured thereto, a pair of concentric gears of different diameter than said secured gear freely rotatable on said shaft, planet gears carried by said pair of gears, internal and external gears concentric with the shaft and meshing with said planet gears, means for fixing one of said latter named gears against rotation, means for varying the pitch of shaft-carried propeller blades in response to rotation of the other of said planet gear meshing gears relative to the propeller shaft, and a plurality of pairs of gears having clutching means for coupling the gears of each of said pairs together at will mounted eccentric of said shaft, at least one of said eccentric pairs of gears having its gears meshing with said secured gear and one of said pair of concentric gears respectively, and one of said eccentric pairs of gears having its gears meshing with said secured gear and the other of said pair of concentric gears respectively.

2. In a variable pitch propeller, a shaft, a gear secured thereto, a pair of concentric gears of different diameter than said keyed gear freely rotatable on said shaft, planet gears carried by said pair of gears, gears adapted for relative rotation concentric with said shaft and meshing with said planet gears, means for fixing one of said latter named gears against rotation, means for varying the pitch of shaft carried propeller blades in response to rotation of the other of said planet gear engaging gears, and a plurality of pairs of gears eccentrically mounted with respect to said shaft having clutching means for coupling the gears of each of said pairs together at will, at least one of said eccentric pairs of gears meshing with said secured gear and one of said pair of concentric gears, and, one of said eccentric pairs of gears meshing with said secured gear and the other of said pair of concentric gears.

3. In a variable pitch propeller including a drive shaft; a differential planetary gear arranged around said drive shaft, including a planet gear carrier, planet gears thereon, and concentric relatively rotatable gears meshing with said planet gears; said propeller including a hub having swiveled blades carried by said shaft and means for swiveling said blades to effect changes in pitch; a connection to operate said means in response to rotation relative to said shaft of one of said concentric gears and carrier, means for fixing one of said concentric gears against rotation, and five means for effecting rotation of the remaining of said concentric gears and carrier from said drive shaft, at five different rates of speed to effect changes in pitch at two rates of speed for decreasing pitch, and two rates of speed for increasing pitch, and at a rate of speed to fix pitch.

4. In a propeller pitch-changing mechanism for a propeller having rotatably mounted blades, a planetary gear system comprising coaxial sun and ring gears one including means to hold it against rotation and the other being drivably connected to rotate said blades to alter the pitch thereof, planet gears meshing with both said sun and ring gears, a carrier for said planet gears, at least one drive gear coaxially secured to said carrier, and a plurality of gear means driven by propeller rotation selectively operable to drive said last-mentioned gear to rotate said carrier at different speeds to respectively alter the pitch of said blades and to hold them in fixed-pitch position.

5. In a propeller pitch-changing mechanism for a propeller having rotatably mounted blades, a planetary gear system comprising coaxial sun and ring gears one including means to hold it against rotation and the other being drivably connected to rotate said blades to alter the pitch thereof, planet gears meshing with both said sun and ring gears, a carrier for said planet gears, at least one drive gear coaxially secured to said carrier, a plurality of individual gears of different diameters in mesh with said carrier gear and means driven by propeller rotation operable to drive said individual gears.

6. In a propeller pitch-changing mechanism for a propeller having rotatably mounted blades, a planetary gear system comprising coaxial sun and ring gears one including means to hold it against rotation and the other being drivably connected to rotate said blades to alter the pitch thereof, planet gears meshing with both said sun and ring gears, a carrier for said planet gears, at least one drive gear coaxially secured to said carrier, a plurality of individual gears of different diameters in mesh with said carrier gear, propeller-driven means for driving said individual gears, and selective clutch means for operatively connecting said last-mentioned means with one or another of said individual gears to drive said carrier gear at different speeds adapted respectively to hold said blades in fixed-pitch position, to increase pitch at a relatively slow rate, to decrease pitch at a relatively slow rate, to increase pitch at a relatively fast rate, and to decrease pitch at a relatively fast rate.

7. In a variable pitch propeller pitch changing gear system, a drive shaft; a gear keyed thereon, a second gear freely rotatable on said shaft, coaxial fixed-axis back gears meshing with respective keyed and second gears, means selectively operable to clutch said back gears together and to free them for relative rotation, differential planetary gearing having three relatively rotatable concentric elements, means connecting one of said elements to said second gear, means to hold a second of said elements against rotation, variable pitch blades rotatable with said propeller, and means connecting said blades to the third of said elements whereby the blades are changed in pitch in response to rotation of the third element relative to said shaft.

8. In a variable pitch propeller pitch changing gear system, a drive shaft; a gear keyed thereon, a second gear freely rotatable on said shaft, coaxial fixed-axis back gears of different diameter meshing with respective keyed and second gears, means selectively operable to clutch said back gears together and to free them for relative rotation, differential planetary gearing having three relatively rotatable concentric elements, means connecting one of said elements to said second gear, means to hold a second of said elements against rotation, variable pitch blades rotatable with said propeller, and means connecting said blades to the third of said elements whereby the blades are changed in pitch in response to rotation of the third element relative to said shaft.

9. In a variable pitch propeller including a propeller shaft, a gear secured to said shaft, a planetary pinion carrier mounted on said shaft for free rotation, said carrier including a gear coaxial with the shaft whose diameter is greater than the secured gear, a fixed internal gear including means holding it against rotation, coaxial with said shaft, a sleeve gear coaxial with the shaft and rotatable relative thereto, planet pinions on said carrier meshing with said fixed internal gear and with said sleeve gear, selectively operable means for driving said carrier mounted gear from said secured gear at different speeds, to cause said sleeve gear to rotate relative to said shaft, said propeller including means responsive to rotation of said sleeve gear relative to said shaft to effect pitch change in the blade of said propeller.

CHARLES W. CHILLSON.

REFERENCES CITED

The following references are of record in the file of this patent:

UNITED STATES PATENTS

| Number | Name | Date |
|---|---|---|
| 1,969,280 | Smith | Aug. 7, 1934 |
| 1,999,091 | Ebert | Apr. 23, 1935 |
| 2,016,846 | Waseige | Oct. 8, 1935 |
| 2,108,660 | Farrell | Feb. 15, 1938 |
| 2,138,487 | Gaba | Nov. 29, 1938 |
| 2,206,874 | Briner | July 9, 1940 |
| 2,248,789 | Setterblade | July 8, 1941 |
| 2,314,025 | Waseige | Mar. 16, 1943 |
| 2,370,675 | McCoy | Mar. 6, 1945 |

FOREIGN PATENTS

| Number | Country | Date |
|---|---|---|
| 499,223 | Great Britain | Jan. 20, 1939 |
| 530,633 | Great Britain | Dec. 17, 1940 |
| 546,995 | Great Britain | Aug. 10, 1942 |